United States Patent
Cheng et al.

(10) Patent No.: US 7,975,074 B2
(45) Date of Patent: Jul. 5, 2011

(54) DATA TRANSMITTING METHOD WITH MULTIPLE TOKEN MECHANISM IN WIRELESS TOKEN RING PROTOCOL

(75) Inventors: Ray-Guang Cheng, Keelung (TW); Ruei-I Chang, Chiayi (TW)

(73) Assignee: National Taiwan University of Science and Technology, Taipei (TW)

( * ) Notice: Subject to any disclaimer, the term of this patent is extended or adjusted under 35 U.S.C. 154(b) by 246 days.

(21) Appl. No.: 11/969,921

(22) Filed: Jan. 7, 2008

(65) Prior Publication Data
US 2009/0055909 A1 Feb. 26, 2009

(30) Foreign Application Priority Data
Aug. 20, 2007 (TW) ............................... 96130677 A

(51) Int. Cl.
G06F 15/16 (2006.01)
G06F 15/173 (2006.01)
H04L 12/42 (2006.01)
(52) U.S. Cl. ......... 709/251; 709/238; 370/450; 370/909
(58) Field of Classification Search .................. 709/238, 709/251; 370/450, 909
See application file for complete search history.

(56) References Cited

U.S. PATENT DOCUMENTS

| 4,707,830 | A * | 11/1987 | Ulug .............................. 370/454 |
| 5,737,328 | A * | 4/1998 | Norman et al. ................ 370/331 |
| 6,487,606 | B1 * | 11/2002 | Minyard et al. ............... 709/251 |
| 2002/0071449 | A1 * | 6/2002 | Ho et al. ........................ 370/447 |
| 2003/0061389 | A1 * | 3/2003 | Mazza .......................... 709/248 |
| 2009/0117883 | A1 * | 5/2009 | Coffing et al. ............. 455/414.1 |

OTHER PUBLICATIONS

Article titled "WTRP—Wireless Token Ring Protocol" authored by Ergen et al., IEEE Transactions on Vehicular Technology, vol. 53, No. 6, Nov. 2004 (pp. 1863-1881).

* cited by examiner

*Primary Examiner* — Ranodhi N Serrao
(74) *Attorney, Agent, or Firm* — Jianq Chyun IP Office

(57) ABSTRACT

A data transmission method with multiple token mechanism in wireless token ring protocol is provided. First, (a) a logical ring with M nodes is provided; (b) a k-th node is selected from the logical ring, and a token in the k-th node is generated; (c) a first message is sent to a (k+1)-th node from the k-th node with the token, and whether the (k+1)-th node responds a second message is judged, if yes, the data to be transmitted is transmitted from the k-th node, otherwise, the token of the k-th node is eliminated; (d) the token is sent to the (k+1)-th node from the k-th node after completing the transmission of the transmitted data of the k-th node, a generation token sequence is generated in a i-th node, and sent to a (i−1)-th node; and (e) the token is generated for the (i−1)-th node with the generation token sequence.

9 Claims, 13 Drawing Sheets

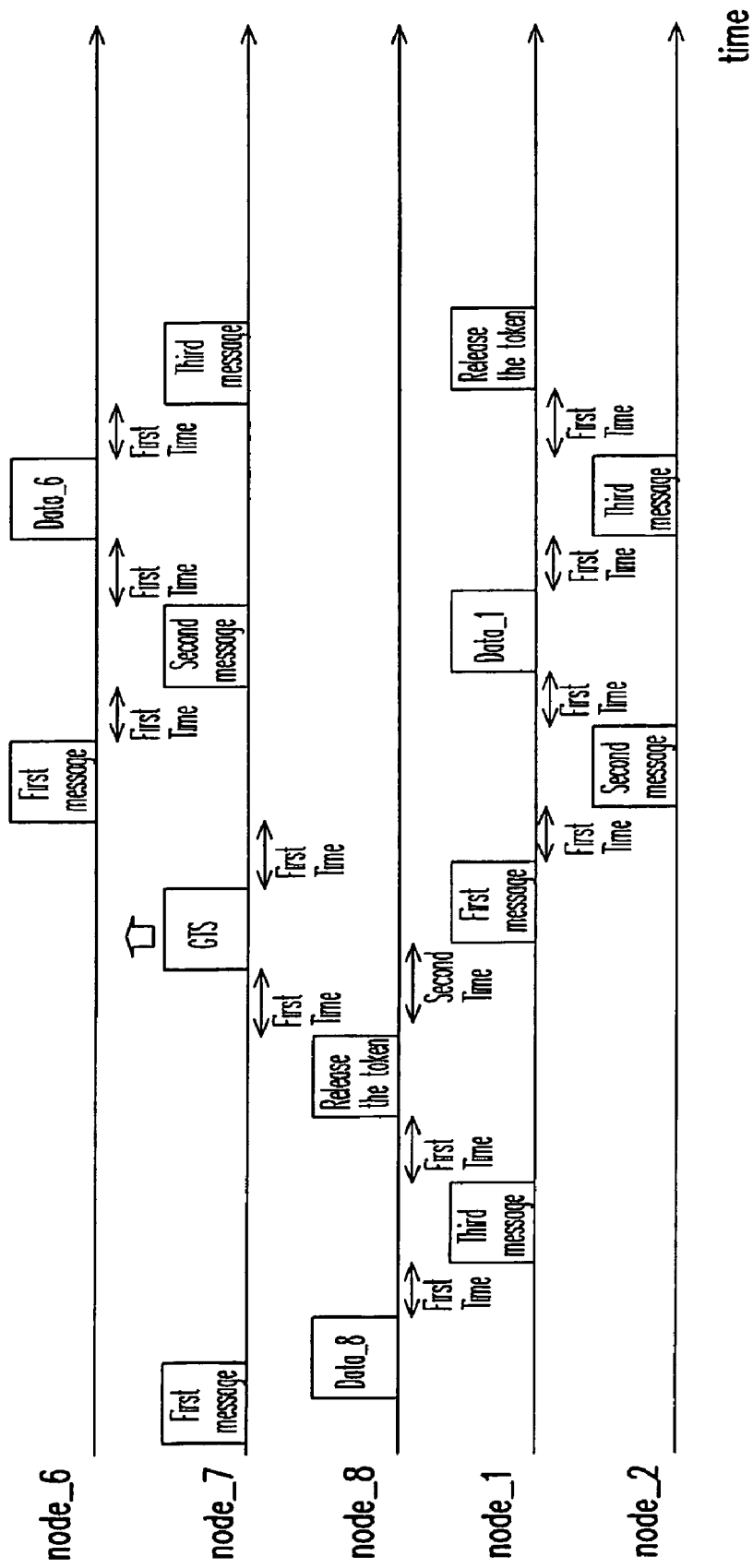

DATA TRANSMITTING METHOD WITH MULTIPLE TOKEN MECHANISM IN WIRELESS TOKEN RING PROTOCOL

CROSS-REFERENCE TO RELATED APPLICATION

This application claims the priority benefit of Taiwan application serial no. 96130677, filed on Aug. 20, 2007. The entirety of the above-mentioned patent application is hereby incorporated by reference herein and made a part of this specification.

BACKGROUND OF THE INVENTION

1. Field of the Invention

The present invention relates to a data transmission method for a wireless network. More particularly, the present invention relates to a data transmission method with multiple token mechanism in wireless token ring protocol.

2. Description of Related Art

With development of wireless communication techniques, wireless networks have been widely used in our daily life. Since transmission lines are not required during wireless communication, the cost for constructing and maintenance of the transmission lines may be avoided.

Presently, an 802.11 standard has been defined by the institute of electrical and electronics engineers (IEEE). The 802.11 standard is widely used in different scenes of wireless communication. For example, in a coffee shop for afternoon tea, a user may communicate with others or surf on the Internet via a notebook computer and a wireless access point. However, the wireless access point has to be connected to the transmission lines for the user to connect the Internet. If a plurality of users is about to surf on the Internet simultaneously, the wireless access point may be used as a central controller, by which a medium access control (MAC) protocol of the 802.11 standard is applied in coordination with the wireless access point to avoid a collision during packets transmission.

Referring to FIG. 1 and FIG. 2, FIG. 1 is a schematic diagram of a MAC protocol of the 802.11 standard. FIG. 2 is a timing diagram illustrating a relationship of signals according to a MAC protocol of the 802.11 standard. In the 802.11 standard, the MAC protocol of the 802.11 standard is a contention MAC protocol, by which request-to-send (RTS) packets, clear-to-send (CTS) packets and network allocation vector (NAV) information are sent to avoid the collision of the transmission packets. When a node_1 is used for transmitting data to a wireless access point W_AP (node_1~node_4 are wireless communication devices, for example notebook computers, personal digital assistants (PDAs), and cell phones etc.), the node_1 transmits the RTS packet and the NAV information (the NAV is packaged within the RTS packet, and is a header of the packet) to the wireless access point W_AP and other nodes, such as a node_3 and a node_4 within the signal coverage of the node_1, so as to notify the wireless access point W_AP, the node_3 and the node_4 there will be data to be transmitted, and the time required for transmission (by the NAV information). When the wireless access point W_AP receives the RTS packet, and after a waiting time of short inter frame space (SIFS), the wireless access point W_AP transmits the CTS packet and the NAV information (the NAV is packaged within the CTS packet, and is a header of the packet) to the node_1 from which the RTS packet is transmitted and the other nodes within the signal coverage of the wireless access point W_AP, such as the node_2, the node_3 and the node_4, so as to notify the node_1 that data transmission is permitted, and to notify the node_2, the node_3 and the node_4 that there will be data to be received, and the time required for receiving (by the NAV information). When the node_1 receives the CTS packet, and after the waiting time SIFS, the node_1 then transmits a data packet Data_A. When the wireless access point W_AP receives the data packet Data_A successfully, and after the waiting time SIFS, the wireless access point W_AP responds an acknowledgement (ACK) packet to the node_1, so as to notify the node_1 that transmission of the data packet Data_A to the wireless access point W_AP is successful. Next, after a waiting time of distributed inter frame space (DIFS), the node_1~node_4 may contest with each other to determine which node may transmit the packets.

In FIG. 2, the node_2 is assumed to have successfully obtained a channel utilization privilege. The node_2 transmits the RTS packet and the NAV information (the NAV is packaged within the RTS packet, and is a header of the packet) to the wireless access point W_AP and to the node_3 and node_4 within the signal coverage of the node_2, so as to notify the wireless access point W_AP, the node_3 and the node_4 there will be data to be transmitted, and the time required for transmission (by the NAV information). When the wireless access point W_AP receives the RTS packet, and after the waiting time of SIFS, the wireless access point W_AP transmits the CTS packet and the NAV information (the NAV is packaged within the CTS packet, and is a header of the packet) to the node_2 from which the RTS packet is transmitted and the other nodes within the signal coverage of the wireless access point W_AP, such as the node_1, the node_3 and the node_4, so as to notify the node_2 that data transmission is permitted, and notify the node_1, node_3 and node_4 that there will be data to be received, and the time required for receiving (by the NAV information). When the node node_2 receives the CTS packet, and after the waiting time SIFS, the node_2 then transmits a data packet Data_B. When the wireless access point W_AP receives the data packet Data_B successfully, and after the waiting time SIFS, the wireless access point W_AP responds the ACK packet to the node_2, so as to notify the node_2 that transmission of the data packet Data_B to the wireless access point W_AP is successful. Next, after the waiting time DIFS, the node_1~node_4 may again contest with each other to determine which node may transmit the packet.

According to the MAC protocol of the 802.11 standard, a hidden node problem (i.e. the node_1 cannot be detected by the node_2) is solved, such that the packets collision is avoided. However, the MAC protocol of the 802.11 standard requires the wireless access point W_AP to work as the central controller, and the wireless access point W_AP has to be connected to a cable network. If such a network is constructed in a large area or in an outdoor environment, the cost of the construction will be huge.

Accordingly, a wireless mesh network using a wireless communication technique of multi-hop is provided. However, the multi-hop wireless mesh network can only be applied to a line topology, and the transmitted packet has to be a fixed length packet. For a network system applying a variable length packet, the variable length packet has to be cut and rearranged to form the fixed length packet. Therefore, signal-processing time during transmission is increased, and equipment cost is increased accordingly.

Moreover, a wireless token ring protocol (WTRP) is disclosed recently, and the WTRP allows the multi-hop communication technique to be applied to a ring topology. However, the WTRP may only provide one token to a certain node. In other words, each time only one node is permitted to transmit data, and therefore an output rate of the network system using the WTRP will be decreased due to the above reason.

To solve the aforementioned problems, a concept of spatial reuse for generating a plurality tokens is provided by the present invention, and the collision occurred during packets transmission among the plurality of nodes with the tokens, and the problem of the variable length packet cannot be transmitted can be avoided by applying a token elimination mechanism.

SUMMARY OF THE INVENTION

The present invention is directed to a data transmission method with multiple token mechanism in wireless token ring protocol, by which a plurality of tokens is simultaneously applied in a ring topology to enhance an output rate of each node. Moreover, each node may transmit variable length packets, and collision of a plurality of tokens can be avoided.

The present invention is directed to another data transmission method with multiple token mechanism in wireless token ring protocol, by which an output rate of each node is increased, variable length packets may be transmitted and the ring topology is adopted.

The present invention provides a data transmission method with multiple token mechanism in wireless token ring protocol. First, (a) a logical ring with M nodes is provided, wherein the nodes of the logical ring are logically linked to form a ring. A k-th node in the logical ring is logically linked to a (k+1)-th node and a (k−1)-th node; (b) the k-th node is selected from the logical ring, and a token is generated to the k-th node; (c) a first message is sent to the (k+1)-th node from the k-th node with the token, and whether or not the (k+1)-th node responds a second message to the k-th node with the token is then judged, if yes, data to be transmitted may be sent from the k-th node with the token; (d) after the data is transmitted to the (k+1)-th node from the k-th node with the token, the token is released to the (k+1)-th node from the k-th node, meanwhile, a generation token sequence is generated on the i-th node, and the generation token sequence is sent to the (i−1)-th node; (e) the token is generated to the (i−1)-th node with the generation token sequence. Moreover, the above M is a positive integer, and k and i are positive integers less than M.

According to an embodiment of the present invention, in the step (c) of the data transmission method with multiple token mechanism in wireless token ring protocol, if the k-th node with the token judges that the (k+1)-th node does not respond the second message, the k-th node with the token then eliminates its own token. Moreover, the data transmitting method with multiple token mechanism in wireless token ring protocol may be applied to an 802.11 standard.

The present invention provides another data transmission method with multiple token mechanism in wireless token ring protocol. First, (a) a plurality of nodes are provided, wherein the nodes are logically linked to form a logical ring. Each node in the logical ring is logically linked to a first adjacent node and a second adjacent node, and the second adjacent node is logically linked to a third adjacent node; (b) a node is selected from the nodes within the logical ring, and a token is generated on the selected node; (c) a first message is sent to the first adjacent node from the node with the token, and the first adjacent node determines whether or not to transmit a second message to the node with the token according to a judgment of whether the first adjacent node is in a non-busy state; (d) if the node with the token receives the second message output from the first adjacent node, whether the node with the token is about to transmit data to the first adjacent node is then determined; (e) if the node with the token is about to transmit the data to the first adjacent node, the node with the token transmits the data to the first adjacent node, and after the first adjacent node receives the data, the first adjacent node responds a third message to the node with the token, and the node with the token then releases the token to the first adjacent node; (f) if the node with the token has no data to be transmitted to the first adjacent node, the node with the token then releases the token to the first adjacent node; (g) after the node with the token releases the token to the first adjacent node, the second adjacent node generates a generation token sequence and transmits the generation token sequence to the third adjacent node; (h) the token is generated to the node with the generation token sequence.

According to an embodiment of the present invention, in the step(e), if the first adjacent node does not respond the second message to the node with the token, the node with the token then eliminates its own token. Moreover, the aforementioned data transmission method with multiple token mechanism in wireless token ring protocol may be applied to the 802.11 standard.

According to an embodiment of the present invention, the first adjacent node is logically clockwise (anti-clockwise) linked with the node, the second adjacent node is logically anti-clockwise (clockwise) linked with the node, and the third adjacent node is logically anti-clockwise (clockwise) linked with the second adjacent node.

Since a concept of spatial reuse and a token elimination mechanism are applied in the present invention, the data transmitting method of the present invention with multiple token mechanism in wireless token ring protocol may be applied to the network system applying the variable length packet. The network system applying the data transmitting method of the present invention with multiple token mechanism in wireless token ring protocol allows the plurality of tokens to be used simultaneously on the nodes in the network system, so as to improve the output rate of each node. Moreover, in the data transmission method of the present invention, the token elimination mechanism is applied to avoid the collision of the plurality of tokens, such that each node within the network may transmit the variable length packets freely.

In order to make the aforementioned and other objects, features and advantages of the present invention comprehensible, a preferred embodiment accompanied with figures is described in detail below.

BRIEF DESCRIPTION OF THE DRAWINGS

FIG. 3C is applied to a system complied with the 802.11 standard.

FIG. 4B is a timing diagram illustrating a relationship of the signals according to the embodiment of FIG. 4A.

DESCRIPTION OF EMBODIMENTS

To improve an output rate of a node, transmit a variable length packet and adopt a ring topology, a concept of spatial reuse is provided by the present invention to enhance an existing wireless token ring protocol, and a token elimination mechanism is provided, such that a network system applying a data transmission method of the present invention with multiple token mechanism in wireless token ring protocol may transmit the variable length packets.

Figure 1:
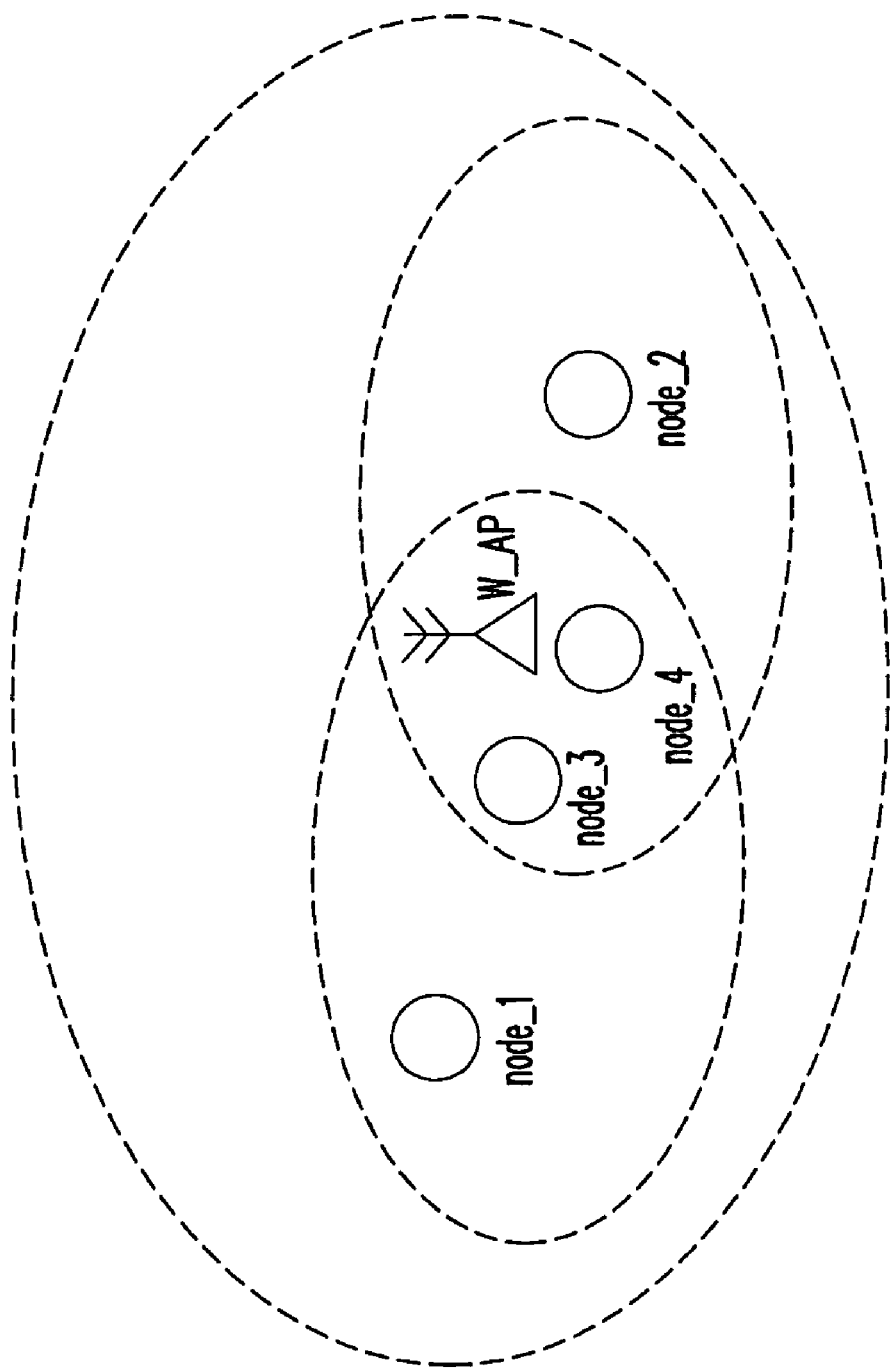
FIG. 1 is a schematic diagram of a MAC protocol of the 802.11 standard.
Figure 2:
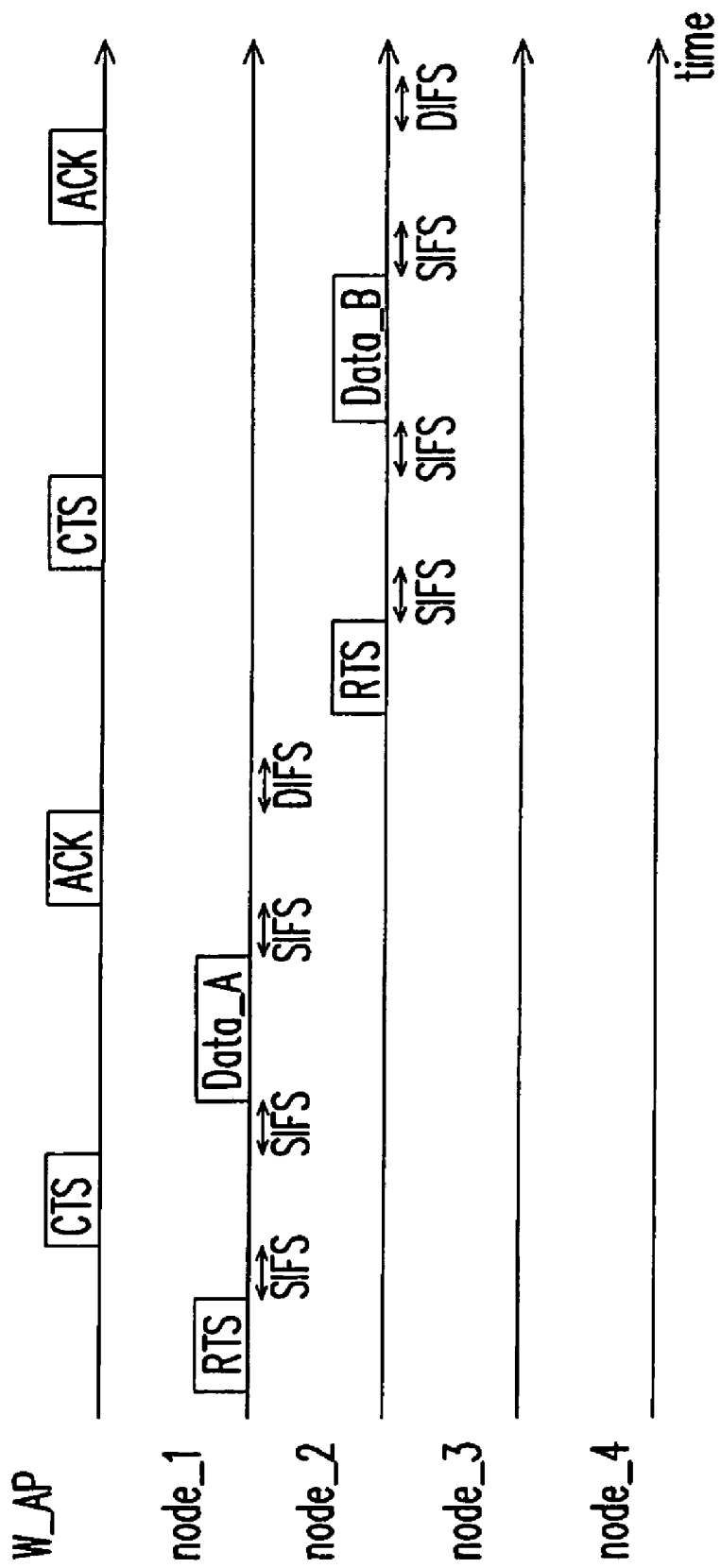
FIG. 2 is a timing diagram of illustrating a relationship of signals according to a MAC protocol of the 802.11 standard.
Figure 3A:
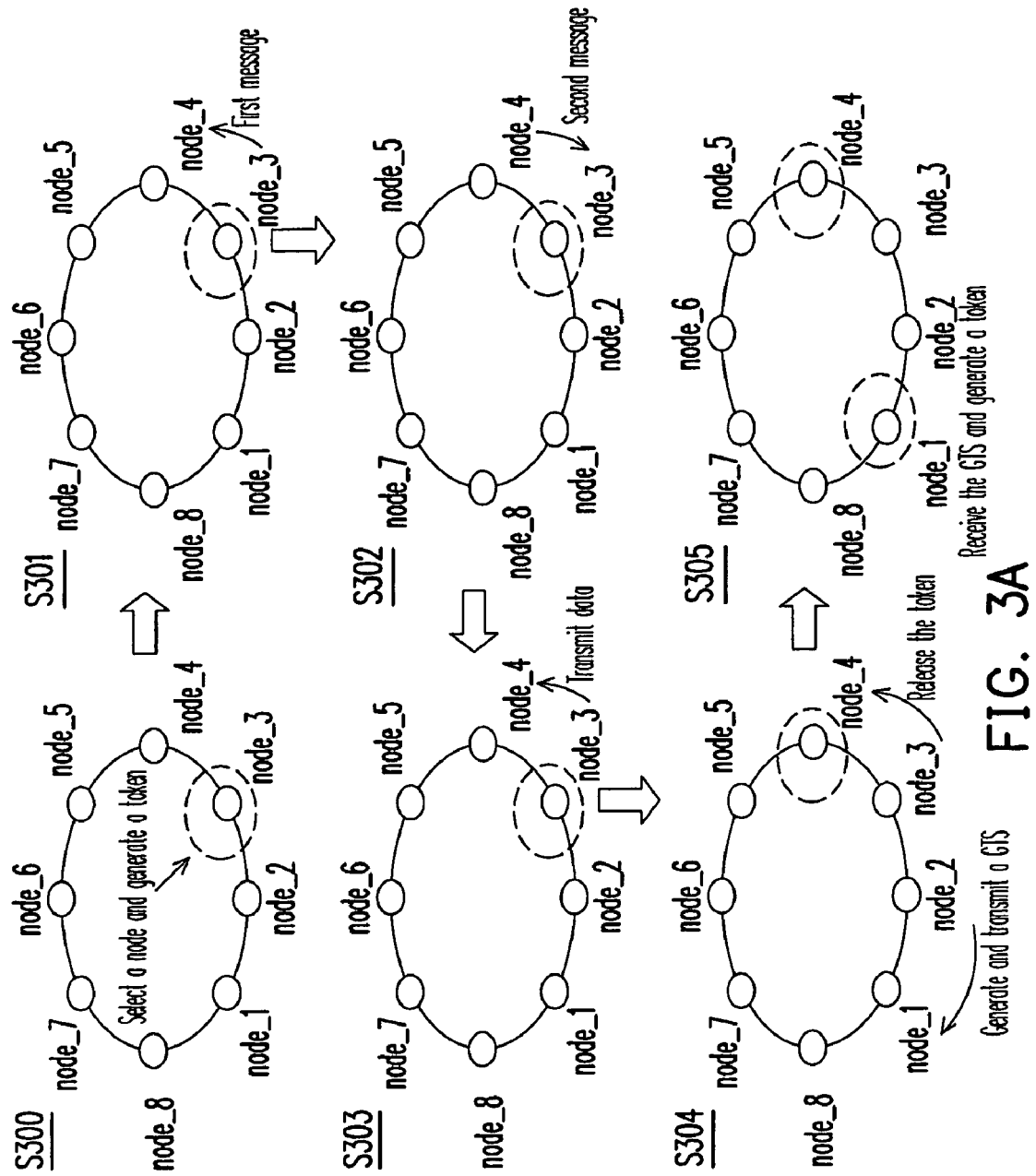
FIG. 3A is a state flowchart illustrating a data transmitting method with multiple token mechanism in wireless token ring protocol according to an embodiment of the present invention.

FIG. 3A is a state flowchart illustrating a data transmitting method with multiple token mechanism in wireless token ring protocol according to an embodiment of the present invention. Referring to FIG. 3A, a plurality of nodes node_1~node_8 are logically formed a logical ring. For example, a node_3 within the logical ring is logically linked to a node_2 and a node_4; the node_2 is logically linked to a node_1 and the node_3; a node_8 is logically linked to the node_1 and a node_7. The node_1~node_8 may be computers having wireless network interface cards, cell phones, PDAs or other wireless communication devices.

The embodiment illustrated in FIG. 3A includes the following steps. First, step S300, a node is selected from the logical ring according to the method of the present invention. In the present embodiment, the selected node is assumed to be the node_3, and a token is generated to the node_3. For convenience, in FIG. 3A to FIG. 6, the nodes surrounded by dash lines represent the node with the token.

Next, step S301, the node_3 with the token transmits a first message to the node_4, and the node_4 receives the first message and determines whether or not to respond a second message to the node_3. In the present embodiment of FIG. 3A, the second message is assumed to be responded to the node_3 by the node_4, and in an embodiment of FIG. 4A, a situation of no response of the second message will be described.

Referring to FIG. 3A again, next, step S302, the node_4 responds the second message to the node_3 to notify the node_3 data transmission is allowed. Step S303, after the node_3 receives the second message, the node_3 transmits a Data_3 to the node_4. In the present embodiment, the node_3 in FIG. 3A is assumed to have the Data_3 to be transmitted to the node_4, and in the embodiment of FIG. 5A, a situation of no data to be transmitted from the node_3 will be described.

Next, when the transmission of the Data_3 to the node_4 from the node_3 is confirmed to be successful, a step S304 may be undertaken. Step S304, the node_3 releases the token to the node_4, and meanwhile the node_2 within the signal coverage of the node_3 may overhear the token release of the node_3. The present embodiment provides a token generation mechanism, by which when the node_2 overhears the token release of the node_3, the node_2 generates a generation token sequence GTS, and transmits the generation token sequence GTS to the node_1.

Next, at step S305, the node_1 receives the generation token sequence GTS and generates a new token. Finally, the node_1 with the token may start to transmit data to the other nodes in the network. Namely, the logical ring now has two tokens, and two nodes may transmit data simultaneously. Therefore, the output rate of each node is improved.

According to the steps S304 and S305, a concept of spatial reuse is applied to the present invention, and if there is no interference occurred among the transmitted signals, an idle node may output the generation token sequence GTS to generate a new token, so as to improve the output rate of each node. Moreover, in the above embodiment, the generation token sequence GTS is generated by the node_2. However, the generation token sequence GTS may be generated by other nodes as long as no interference occurred among the transmitted signals. For example, the generation token sequence GTS may be generated by the node_3 which releases the token or the node_1 located far away from the node_3.

In the above embodiment, the node_1~node_8 within the logical ring are arranged anticlockwise. However, if the node_1~node_8 are arranged clockwise, it is still construed to be within the scope of the present invention.

To avoid a situation that none of the nodes node_1~node_8 within the logical ring has the token, all the nodes node1~node_8 are in an idle state, and the node_3 selected at the beginning may be a super node. The super node may automatically generate the token when none of the nodes node_1~node_8 within the logical ring has the token.

Whether the aforementioned node_4 responds the second message to the node_3 with the token is determined by whether the node_4 is receiving a transmitted data from a node other than the node_3, or whether the node_4 is transmitting the Data_4 to a node_5. In other words, the node_4 may respond the second message to the node_3 with the token, when the node_4 is in a non-busy state and is allowed to receive the Data_3 transmitted from the node_3.

Figure 3B:
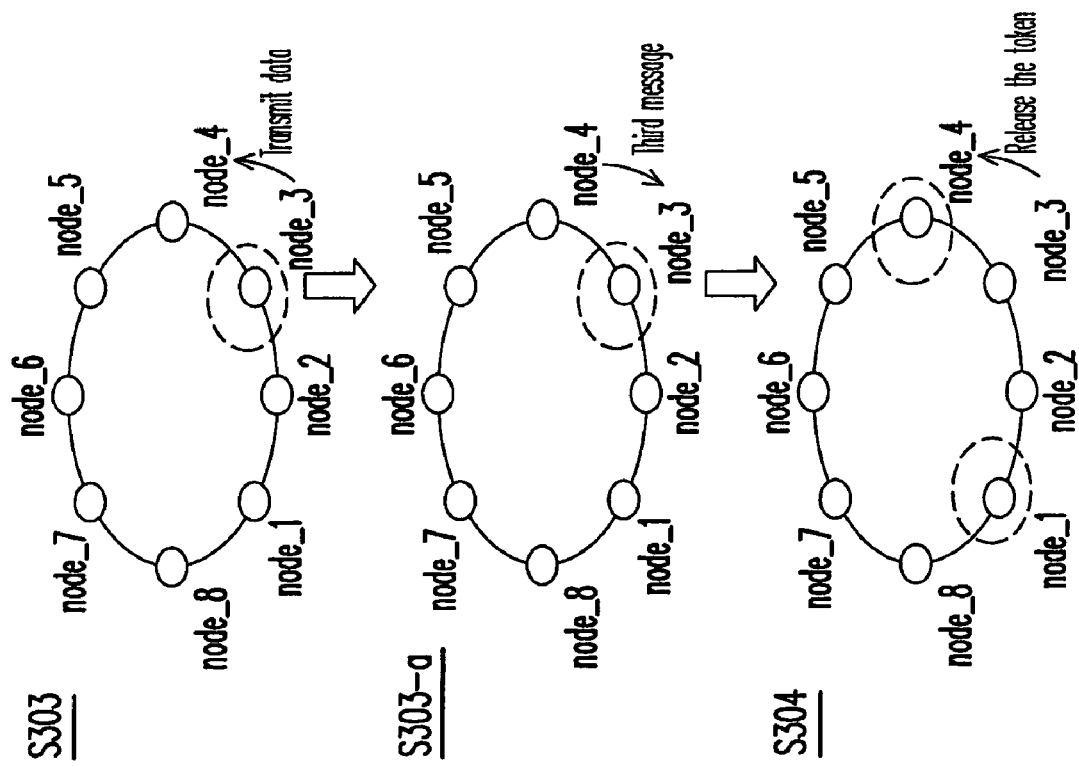
FIG. 3B is a state flowchart illustrating a situation that a response of a third message is required from the node_4 to the node_3.

Next, referring to FIG. 3B, FIG. 3B is a state flowchart illustrating a situation that a response is required from the node_4 when data transmission is completed. At step S303, after the data is successfully transmitted to the node_4 from the node_3, a step S303-a may further be undertaken. At step S303-a, after the node_4 receives the Data_3 successfully, the node_4 responds a third message to the node_3, such that the node_3 may confirm the data transmission of the Data_3 from the node_3 to the node_4 is successful. The step 303-a is generally applied in a communication network where an ACK information is required, for example, a transmission control protocol (TCP) network. However, in an application of real-time video transmission, the ACK information is not required after the data is transmitted, for example, a user data protocol (UDP) network.

Figure 3C:
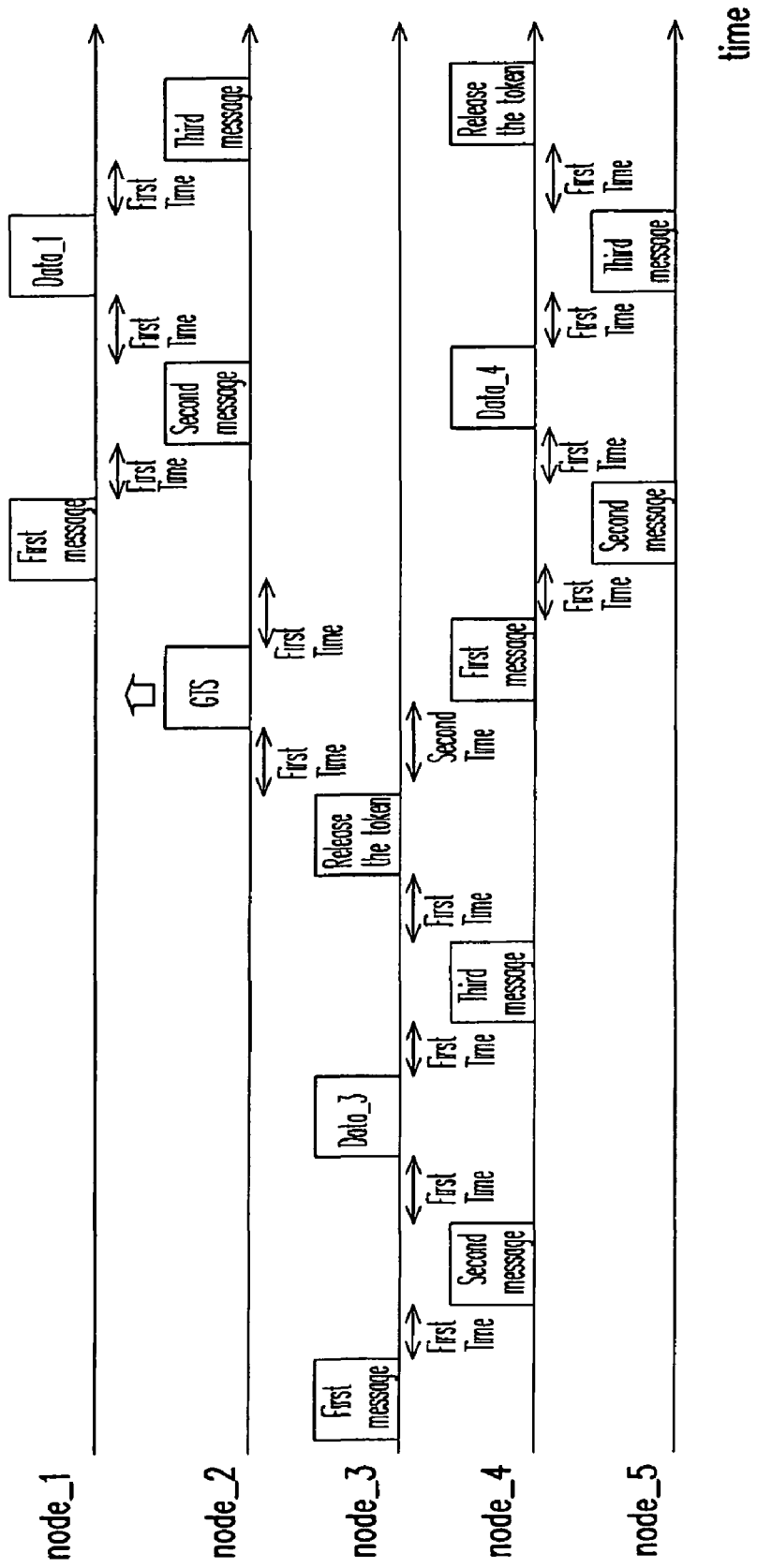
FIG. 3C is a timing diagram illustrating a relationship of the signals according to the embodiment of FIG. 3A and FIG. 3B.

FIG. 3C is a timing diagram illustrating a relationship of the signals according to the embodiment of FIG. 3A and FIG.

3B. Referring to FIG. 3C, to avoid a packet collision, when the signals are transmitted between the nodes, there will be a waiting time for a first time or a second time. As shown in FIG. 3C, when the node_4 receives the first message, the node_4 first waits for the first time, and then determines whether or not to transmit the second message to the node_3. When the node_3 receives the second message, and after the waiting time of the first time, the node_3 transmits the Data_3 to the node_4. When the node_4 successfully receives the Data_3, again after the waiting time of the first time, the node_4 responds the third message to the node_3. Then, the node_3 receives the third message, and after the waiting time of the first time, the node_3 releases the token to the node_4. Next, the node_4 receives the token, and after the waiting time of the second time, the node_4 transmits the first message to the node_5. Moreover, when the node_4 obtains the token from the node_3, and after the waiting time of the first time, the generation token sequence GTS is generated and is transmitted to the node_1. After the node_1 receives the generation token sequence GTS, the node_1 generates the token, and after the waiting time of the first time, the node_1 transmits the first message to the node_2.

Figure 3D:
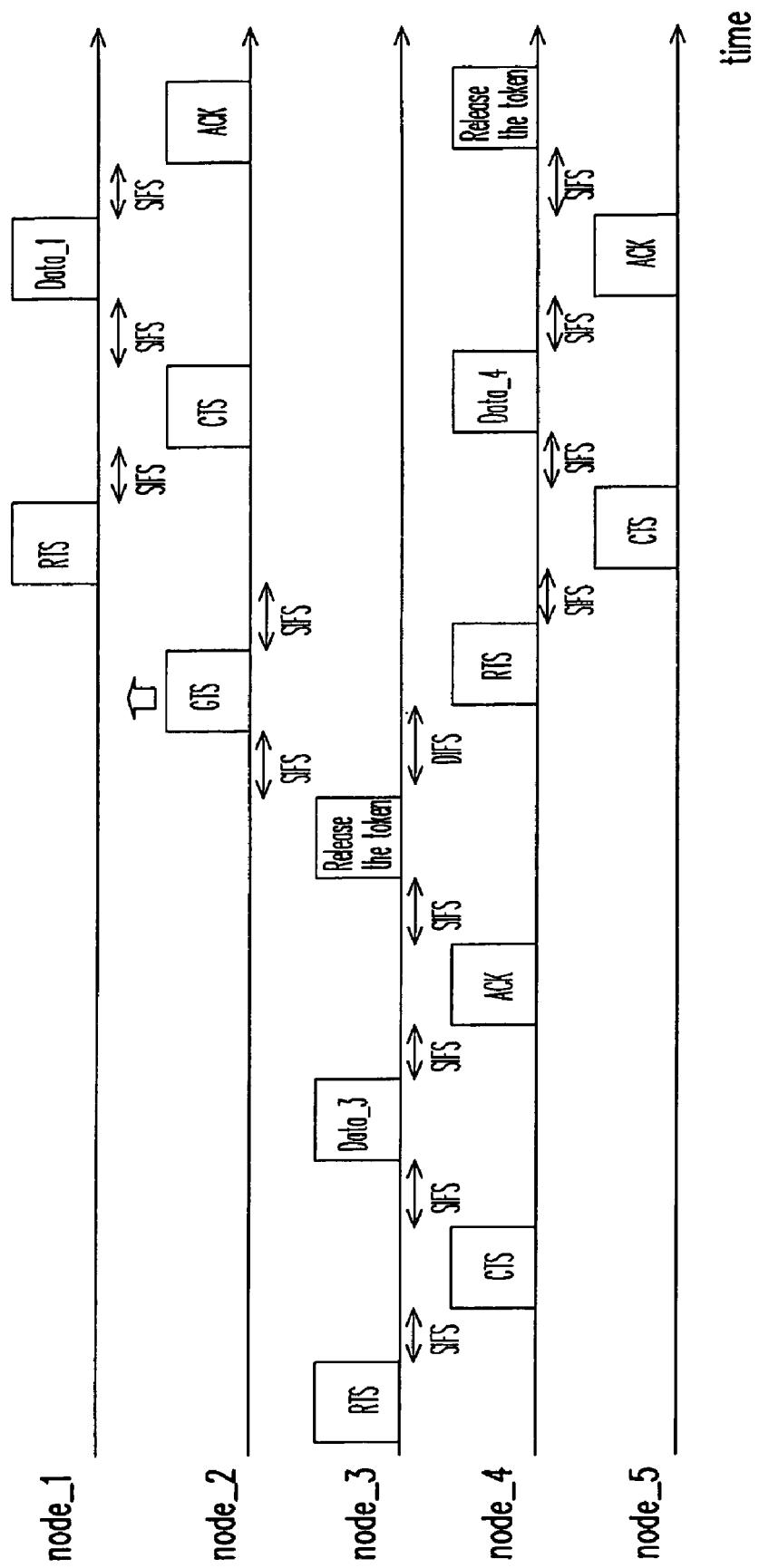
FIG. 3D is a timing diagram illustrating a relationship of the signals when

However, the first time and the second time used in the above embodiment are not intended to limit scope of the present invention, the waiting time for signal transmission between the nodes may be determined by an actual requirement of different network. Moreover, FIG. 3D is a timing diagram illustrating a relationship of the signals when FIG. 3C is applied to a system complied with the 802.11 standard. Referring to FIG. 3D, the first message is a RTS packet including a first NAV information; the second message is a CTS packet including a second NAV information; the third message is an ACK packet. The first time is the time for SIFS, and the second time is the time for DIFS.

Figure 4A:
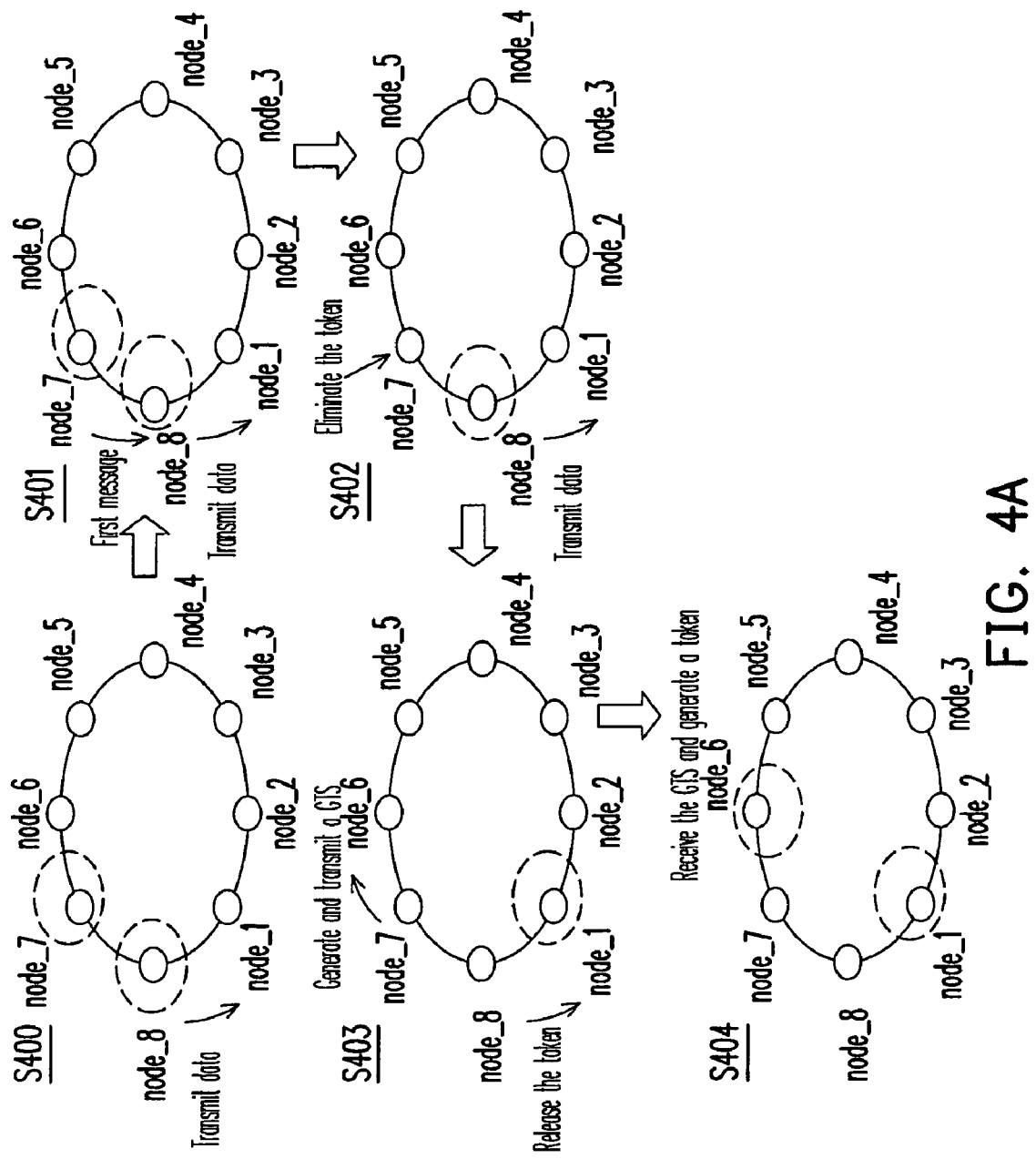
FIG. 4A is another state flowchart illustrating a data transmitting method with multiple token mechanism in wireless token ring protocol according to an embodiment of the present invention.

FIG. 4A is a state flowchart illustrating a data transmission method with multiple token mechanism in wireless token ring protocol according to an embodiment of the present invention. Referring to FIG. 4A, at step S400, the node_7 and the node_8 all have tokens, and the node_8 is transmitting a Data_8 to the node_1. At step S401, the node_7 transmits the first message to the node_8, however the node_8 is in a busy state, and therefore the node_8 will not respond the second message to the node_7. At step S402, since the node_7 does not receive the second message, the node_7 may eliminate the token, and after the node_8 confirms the Data_8 is successfully transmitted to the node_1, a step S403 may be undertaken. According to the above step S402, the present embodiment provides a token elimination mechanism, by which when the node does not receive the second message from the next node, it will automatically eliminate its own token, such that packets collision during transmission in the network can be avoided.

Referring to FIG. 4A again, at step S403, after the node_8 successfully sends the Data_8, the node_8 releases the token to the node_1, while the node_7 generates the generation token sequence GTS and transmits the generation token sequence GTS to the node_6. At step S404, the node_6 receives the generation token sequence GTS and generates the token.

The embodiment of FIG. 4A may be applied to a situation that the node_8 transmits the packets with a larger length, and the other nodes node_2~node_7 transmit the packets with a smaller length, and therefore based on the token elimination mechanism, the method of the present invention may be applied to the network system with variable length packets.

FIG. 4B is a timing diagram illustrating a relationship of the signals according to the embodiment of FIG. 4A. Referring to FIG. 4B, to avoid the packet collision, when the signals are transmitted between the nodes, there will be the waiting time for the first time or the second time. As shown in FIG. 4B, the node_8 is transmitting Data_1 to the node_1. Though the node_7 transmits the first message to the node_8, the node_8 is in the busy state, and therefore the node_8 will not transmit the second message to the node_7. Accordingly, the node_7 may eliminate its own token.

However, the first time and the second time used in the above embodiment are not intended to limit the scope of the present invention, the waiting time for signal transmission between the nodes may be determined by an actual requirement of different network. Moreover, the embodiment shown in FIG. 4B may be applied to the network complied with the 802.11 standard. In this case, the first message is the RTS packet including the first NAV information; the second message is the CTS packet including the second NAV information; and the third message is the ACK packet. The first time is the time for SIFS, and the second time is the time for DIFS.

Figure 5A:
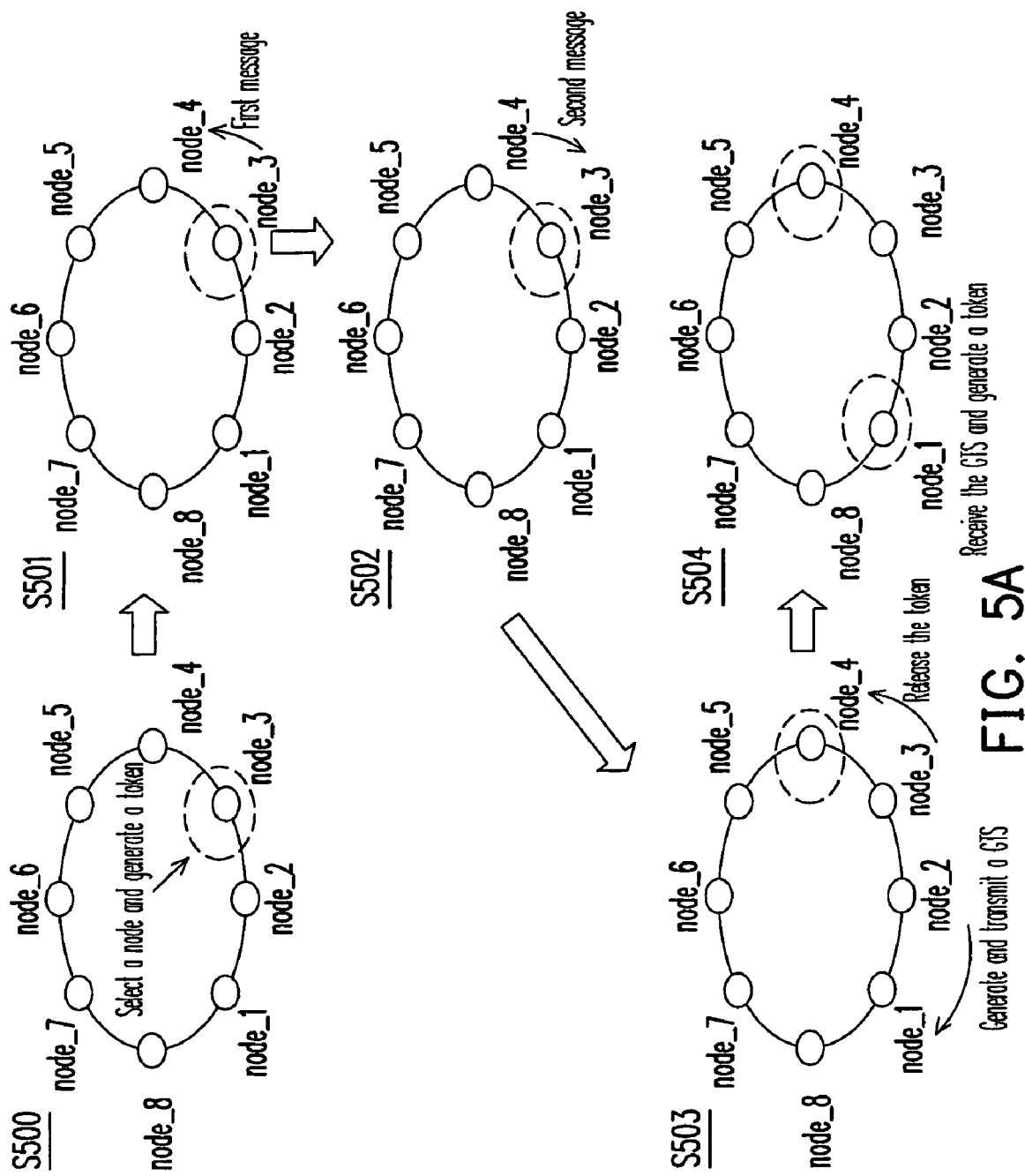
FIG. 5A is another state flowchart illustrating a data transmitting method with multiple token mechanism in wireless token ring protocol according to an embodiment of the present invention.

FIG. 5A is a state flowchart illustrating a data transmission method with multiple token mechanism in wireless token ring protocol according to an embodiment of the present invention. The embodiment of FIG. 5A includes the following steps: at step S500, a node is selected from the logical ring (the node_3 is assumed to be selected), and the token is generated in the node_3. Next, at step S501, the node_3 with the token transmits the first message to the node_4. The node_4 receives the first message and determines whether or not to respond the second message to the node_3 (the node_4 is assumed to respond the second message to the node_3 in the embodiment of FIG. 5A). At step S502, the node_4 responds the second message to the node_3 to notify the node_3 that the data is allowed to be transmitted. Next, step S503, since the node_3 has no data to be transmitted, the node_3 releases the token to the node_4, and the node_2 may generate the generation token sequence GTS and transmit the generation token sequence GTS to the node_1. At step S504, the node_1 receives the generation token sequence GTS and generates the token.

Figure 5B:
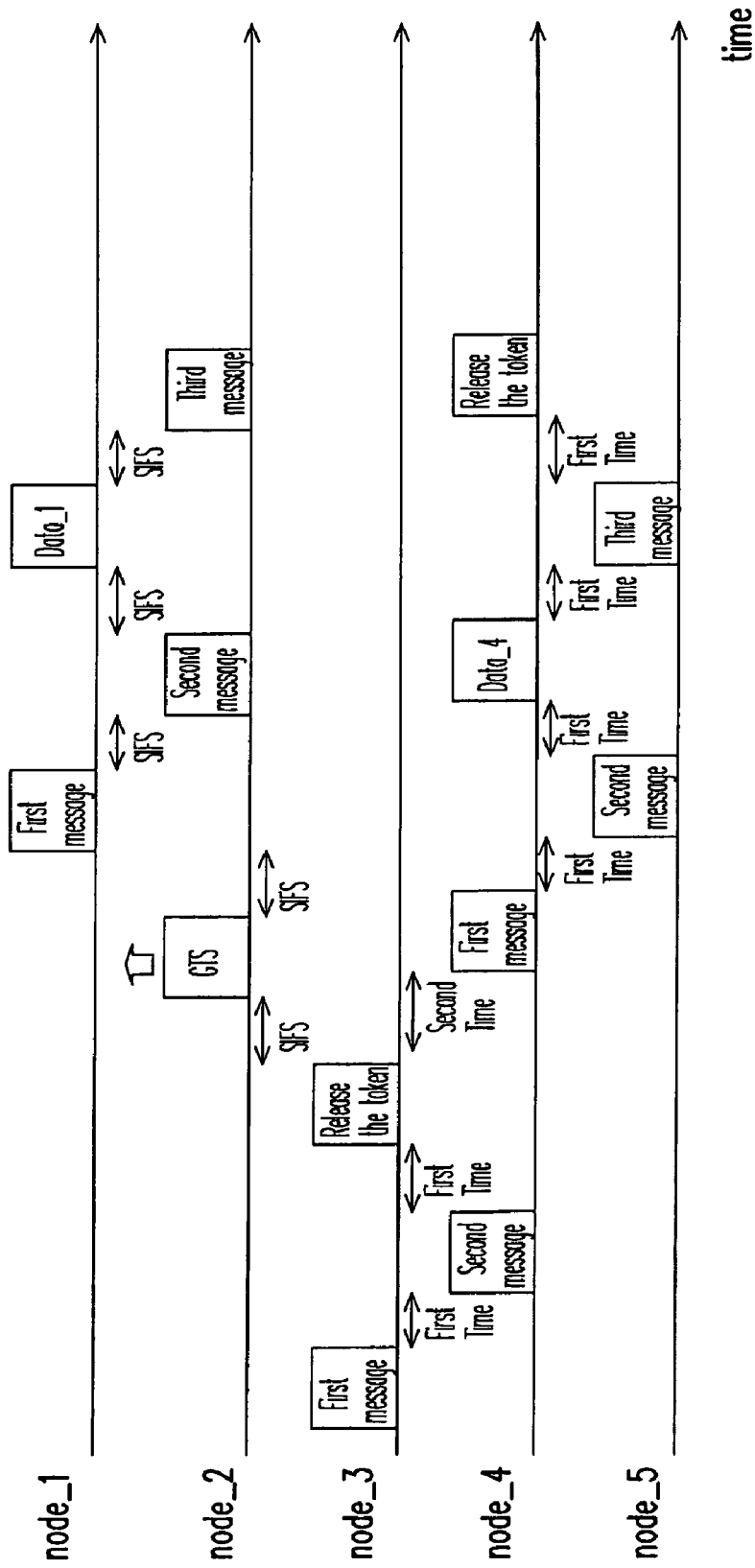
FIG. 5B is a timing diagram illustrating a relationship of the signals according to the embodiment of FIG. 5A.

FIG. 5B is a timing diagram illustrating a relationship of the signals according to the embodiment of FIG. 5A. Referring to FIG. 5B, to avoid the packet collision, when the signals are transmitted between the nodes, there will be the waiting time for the first time or the second time. As shown in FIG. 5B, when the node_4 receives the first message, the node_4 waits for the first time, and then determines whether or not to respond the second message to the node_3. Since the node_3 has no data to be transmitted, and therefore when the node_3 receives the second message, and after the waiting time of the first time, the node_3 releases the token to the node_4. Next, after the node_4 obtains the token, and after the waiting time of the second time, the node_4 transmits the first message to the node_5. Moreover, when the node_4 obtains the token from the node_3, and after the waiting time of the first time, the generation token sequence GTS is generated and is transmitted to the node_1. After the node_1 receives the generation token sequence GTS, the node_1 generates the token, and after the waiting time of the first time, the node_1 transmits the first message to the node_2.

However, the first time and the second time used in the above embodiment are not intended to limit the scope of the present invention, the waiting time for signal transmission between the nodes may be determined by an actual requirement of different network. Moreover, the embodiment shown in FIG. 5B may be applied to the network complied with the 802.11 standard. In this case, the first message is the RTS packet including the first NAV information; the second message is the CTS packet including the second NAV information; and the third message is the ACK packet. The first time is the time for SIFS, and the second time is the time for DIFS.

Figure 6:
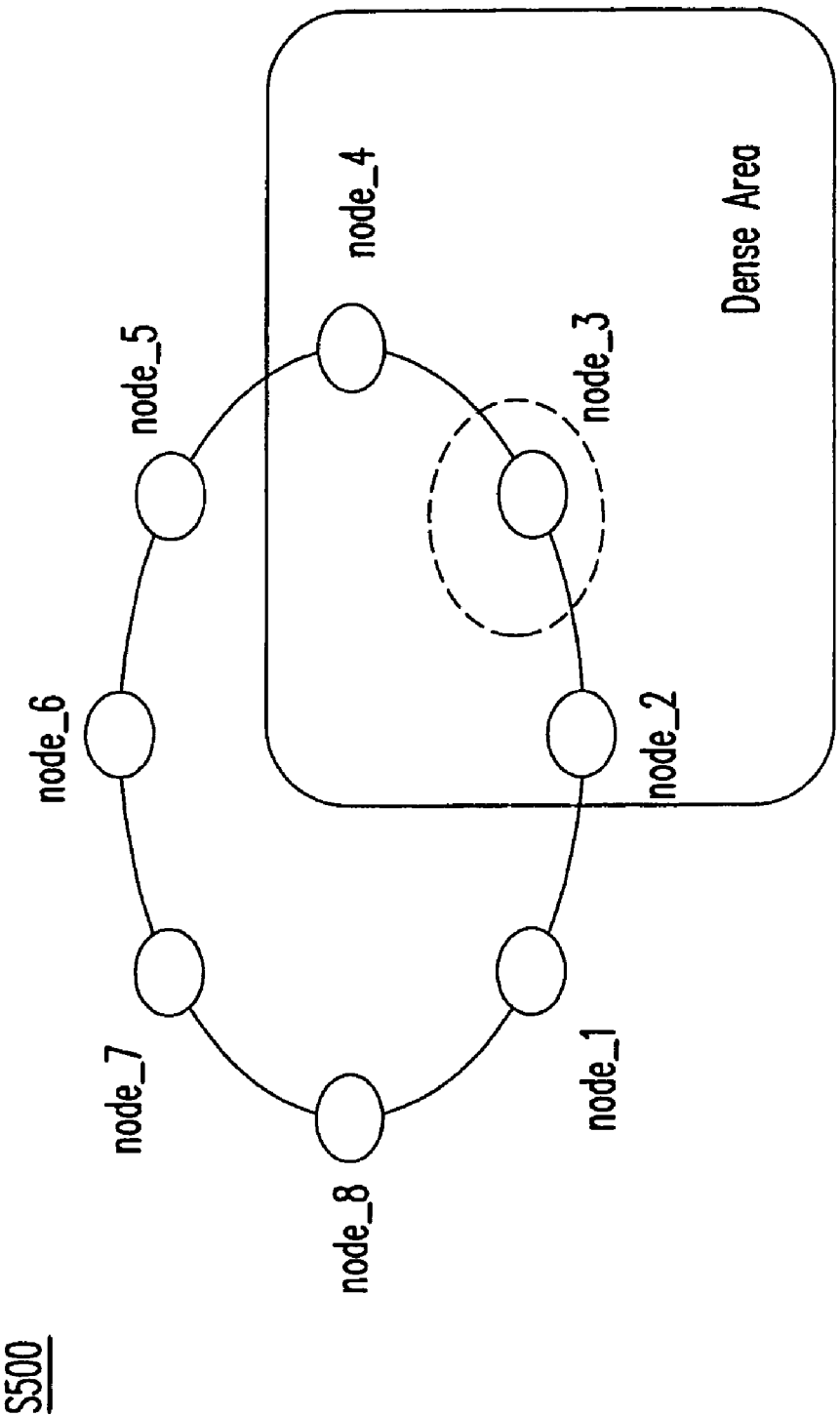
FIG. 6 is a schematic diagram illustrating an embodiment when the node_2, the node_3 and the node_4 are located in a dense area.

FIG. 6 is a schematic diagram illustrating an embodiment when the node_2, the node_3 and the node_4 are located in a dense area. The distances respectively between the node_2, the node_3 and the node_4 are relatively close, resulting in the fact that the output rates of the node_2, the node_3 and the node_4 located in the dense area are decreased. Therefore, the method of the present invention may be modified moderately, by which a conventional data transmission method of wireless token ring protocol may be applied to the node_2, the node_3 and the node_4 located in the dense area, and the data transmission method with multiple token mechanism in wireless token ring protocol provided by the present invention may be applied to the nodes located outside the dense area.

Figure 7:
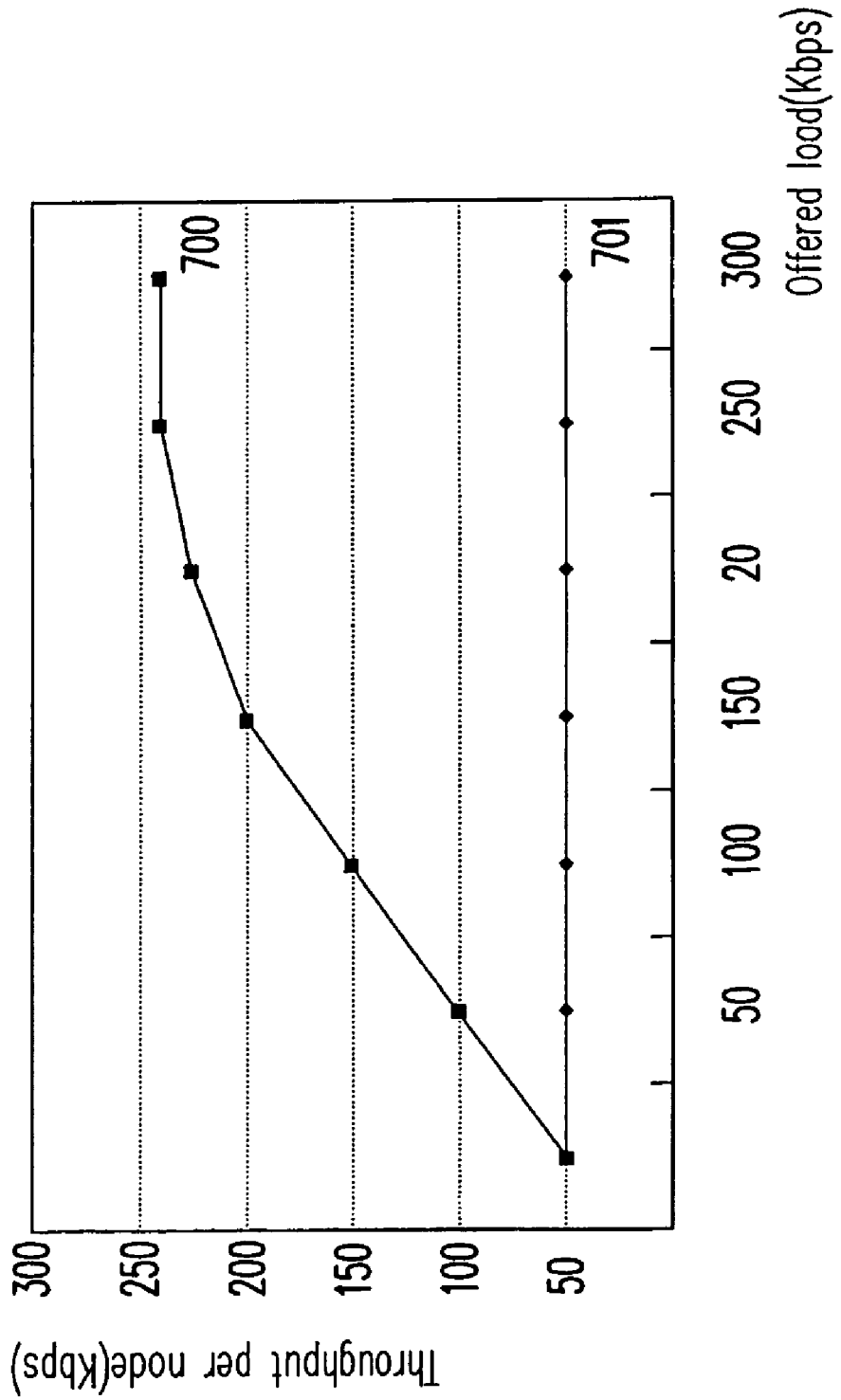
FIG. 7 is a performance comparison diagram between a data transmitting method with multiple token mechanism in wireless token ring protocol provided by the present invention and a conventional data transmitting method of wireless token ring protocol.
Figure 8:
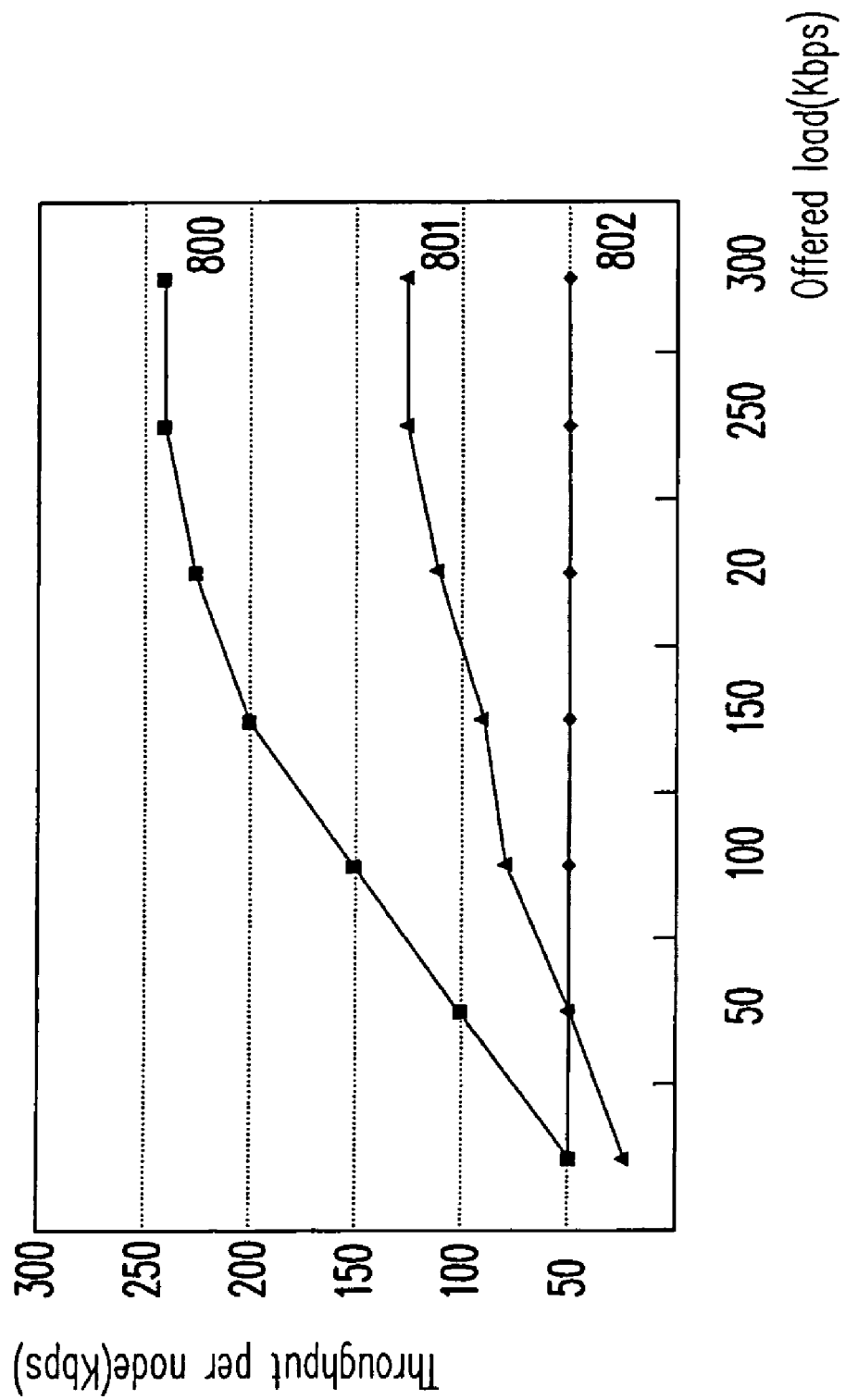
FIG. 8 is a performance comparison diagram between a data transmitting method with multiple token mechanism in wireless token ring protocol provided by the present invention and a conventional data transmitting method of wireless token ring protocol when there exists a dense area.

Referring to FIG. 7 and FIG. 8, FIG. 7 is a performance comparison diagram between a data transmission method with multiple token mechanism in wireless token ring protocol provided by the present invention and a conventional data transmission method of wireless token ring protocol. FIG. 8 is a performance comparison diagram between a data transmitting method with multiple token mechanism in wireless token ring protocol provided by the present invention and a conventional data transmitting method of wireless token ring protocol when there exists a dense area. As shown in FIG. 7, a simulation environment of this performance comparison diagram includes the following features: 18 nodes, packet length of 1024 bytes and 1500 bytes, and no dense area exists. As shown in FIG. 7, the curve 700 is a performance curve of the data transmission method of the present invention, and the curve 701 is the performance curve of the conventional data transmitting method of wireless token ring protocol. When an offered load is increased, a throughput per node of the curve 700 is increased accordingly, while the throughput has an upper limit. The throughput per node of the curve 701 is fixed. Therefore, the data transmission method of the present invention has a better performance than that of the conventional data transmission method of wireless token ring protocol. Referring to FIG. 8, the simulation environment of this performance comparison diagram includes the following features: 18 nodes, fixed packet length, and there exists the dense area. As shown in FIG. 8, the curve 800 is the performance curve of the data transmission method of the present invention, wherein the dense area includes three nodes; the curve 801 is the performance curve of the data transmission method of the present invention, wherein the dense area includes six nodes; and the curve 802 is the performance curve of the conventional data transmitting method of wireless token ring protocol, wherein the dense area includes six nodes. When the offered load is less than 100 Kbps, the performance of the curve 802 is better than that of the curve 801; when the offered load is greater than 100 Kbps, the performances of the curve 800 and the curve 801 are better than that of the curve 802. Moreover, the more the nodes are included within the dense area, the poorer the performance is.

Therefore, to improve the performance under a low offered load, the method of the present invention may be modified moderately, by which a conventional data transmission method of wireless token ring protocol may be applied to the nodes located in the dense area, and the data transmission method with multiple token mechanism in wireless token ring protocol provided by the present invention may be applied to the nodes located outside the dense area.

In summary, the concept of spatial reuse is applied in the present invention, such that the nodes within the network may simultaneously generate the plurality of tokens, so as to improve the output rate of each node. Moreover, the present invention further provides a token elimination mechanism to avoid the collision of the transmission packets when the plurality of tokens is applied, and meanwhile the nodes within the network may transmit the variable length packets.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission method with multiple token mechanism in wireless token ring protocol comprising:
providing a plurality of nodes logically linked to form a single logical ring, wherein any arbitrary node in the logical ring is logically linked to a first adjacent node and a second adjacent node, the second adjacent node is logically linked to a third adjacent node, and each of the nodes is a wireless communication apparatus;
selecting a node from the nodes in the single logical ring, and generating a first token to the node;
sending a first message to the first adjacent node from the node with the first token, and determining whether the first adjacent node responds to a second message to the node with the first token according to whether the first adjacent node is in a non-busy state;
determining whether the node with the first token is about to transmit a data to the first adjacent node when the node with the first token receives the second message output from the first adjacent node;
transmitting the data to the first adjacent node from the node with the first token if the node with the first token is about to transmit the data to the first adjacent node, and responding to a third message to the node with the first token by the first adjacent node after the first adjacent node receives the data, and then the node with the first token releases the first token to the first adjacent node;
releasing the first token from the node with the first token to the first adjacent node if the node with the first token has no data to be transmitted to the first adjacent node; and
generating a generation token sequence by the second adjacent node and transmitting the generation token sequence to the third adjacent node, after the node with the first token releases the first token to the first adjacent node so as to generate a second token to the third adjacent node with the generation token sequence and thus making the single logical ring have at least two tokens simultaneously, and at least two nodes of the nodes in the single logical ring transmit data simultaneously.

2. The data transmission method with multiple token mechanism in wireless token ring protocol as claimed in claim 1, wherein the node is a super node, and the super node automatically generates the first token when there is no token in the nodes within the single logical ring.

3. The data transmission method with multiple token mechanism in wireless token ring protocol as claimed in claim 1, wherein when the second message is not responded from the first adjacent node to the node with the first token, the node with the first token eliminates the first token.

4. The data transmission method with multiple token mechanism in wireless token ring protocol as claimed in claim 1, wherein the data to be transmitted by the nodes within the single logical ring is variable length packets.

5. The data transmission method with multiple token mechanism in wireless token ring protocol as claimed in claim 1, wherein the non-busy state represents a state that the first adjacent node is allowed to receive the transmitted data from the node with the token.

6. The data transmission method with multiple token mechanism in wireless token ring protocol as claimed in claim 1 is suitable for a 802.11 standard system, wherein the first message is a RTS packet including a first NAV information, the second message is a CTS packet including a second NAV information, and the third message is an acknowledgement packet.

7. The data transmission method with multiple token mechanism in wireless token ring protocol as claimed in claim 1, wherein the wireless communication apparatus has a wireless network interface card.

8. The data transmission method with multiple token mechanism in wireless token ring protocol as claimed in claim 1, wherein the first adjacent node is logically anti-clockwise linked with the node, the second adjacent node is logically clockwise linked with the node, and the third adjacent node is logically clockwise linked with the second adjacent node.

9. The data transmission method with multiple token mechanism in wireless token ring protocol as claimed in claim 1, wherein the first adjacent node is logically clockwise linked with the node, the second adjacent node is logically anti-clockwise linked with the node, and the third adjacent node is logically anti-clockwise linked with the second adjacent node.

* * * * *